United States Patent
Burnett

[11] 3,744,192
[45] July 10, 1973

[54] HOUSE TRAILER GROUND ANCHOR
[76] Inventor: George E. Burnett, 1020 Josephine St., Marinette, Wis. 54143
[22] Filed: Feb. 15, 1972
[21] Appl. No.: 226,600

[52] U.S. Cl............. 52/23, 52/158, 52/166, 52/295
[51] Int. Cl............. E02d 5/80, E04h 9/14
[58] Field of Search ............. 52/23, 4, 5, 149, 52/166, 155, 157, 295, 169, 158; 248/361

[56] References Cited
UNITED STATES PATENTS

| 2,045,478 | 6/1936 | Kuehn | 52/23 X |
| 2,559,732 | 7/1951 | Padgett | 52/157 X |
| 3,054,151 | 9/1962 | Shankland | 52/23 |
| 3,335,531 | 8/1967 | Grimelli et al. | 52/23 |
| 3,403,487 | 10/1968 | Docter | 52/23 X |
| 3,691,703 | 9/1972 | Barnes | 52/157 X |

Primary Examiner—Price C. Faw, Jr.
Attorney—Alexander B. Blair et al.

[57] ABSTRACT

A ground anchor for house trailers which includes a pair of cylindrical concrete members which extend angularly into the ground at a converging angle and intersect well below the ground. A rod is embedded in each of the cylindrical concrete members with the rods interlocking at their juncture. Turnbuckles connect the upper ends of the rods to the frame of a house trailer and additional turnbuckles connect to straps which engage over the top of the trailer to prevent the trailer from becoming separated from its frame.

5 Claims, 7 Drawing Figures

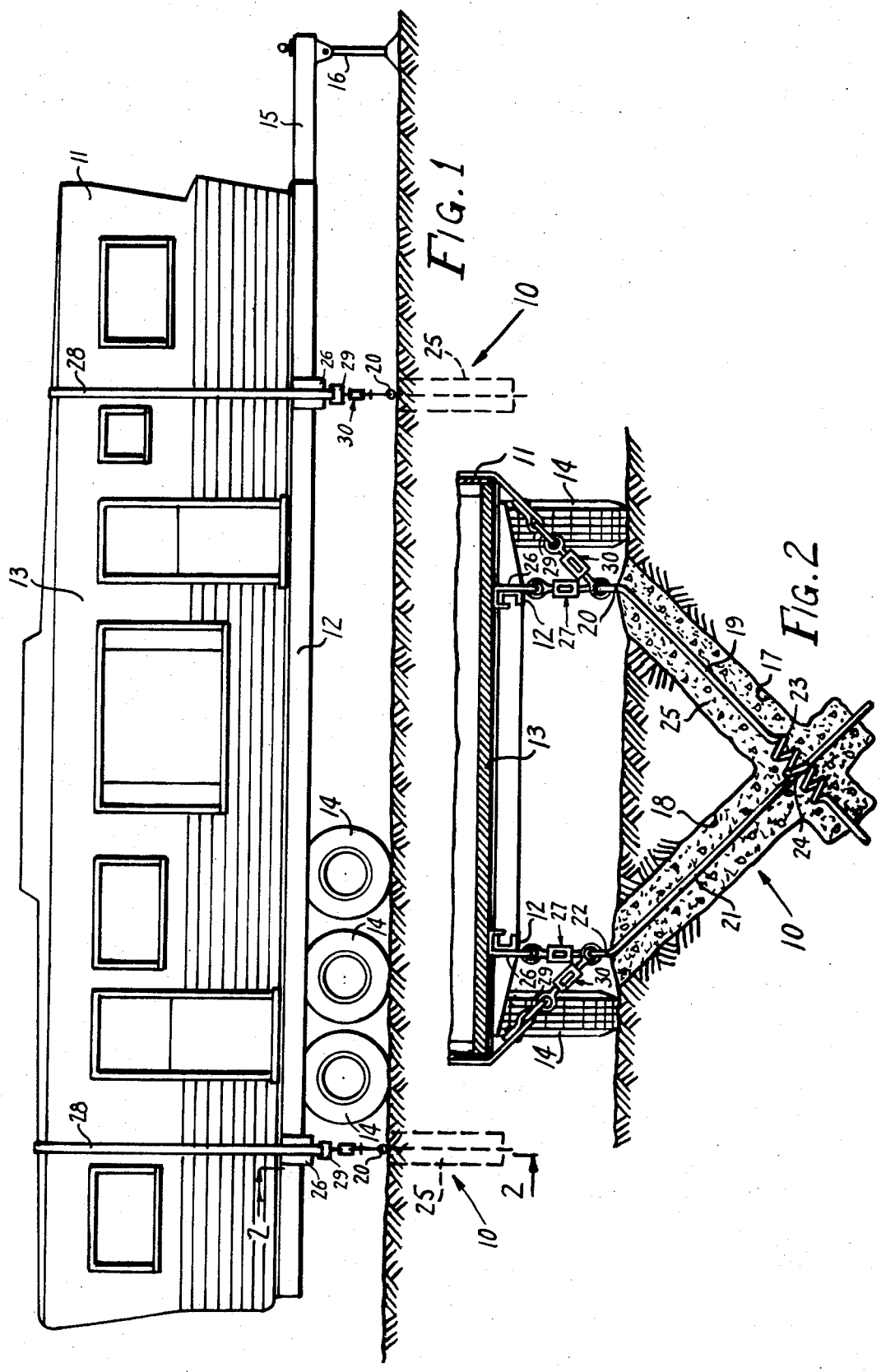

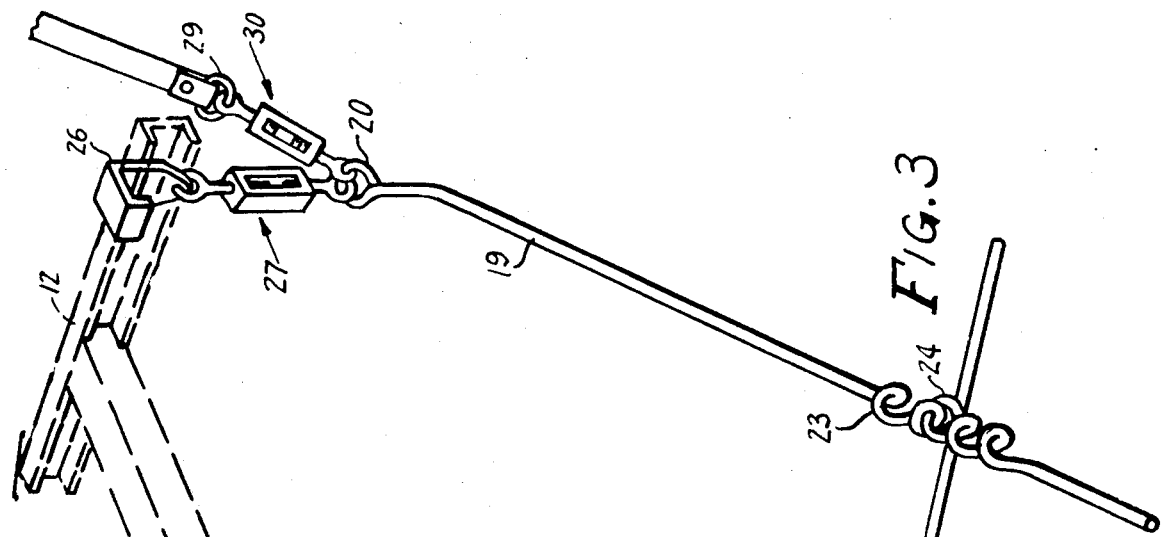
FIG.3
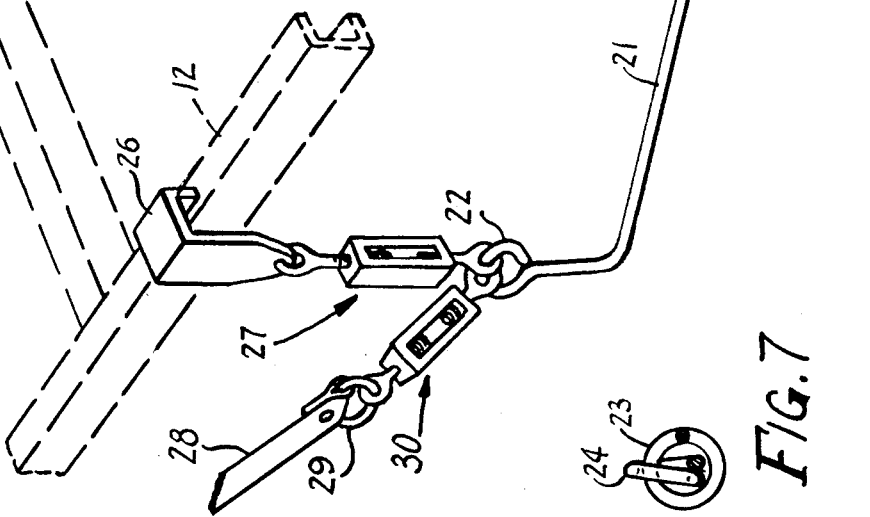
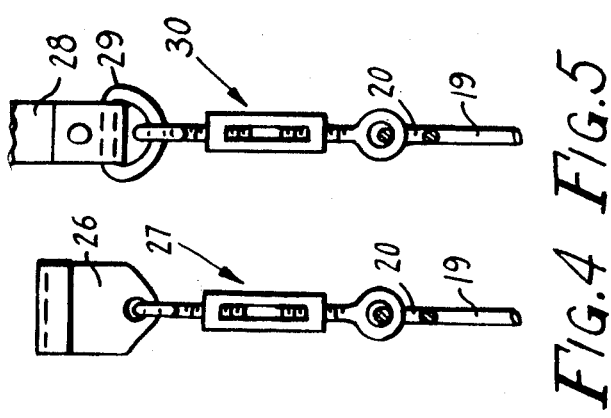
FIG.4  FIG.5
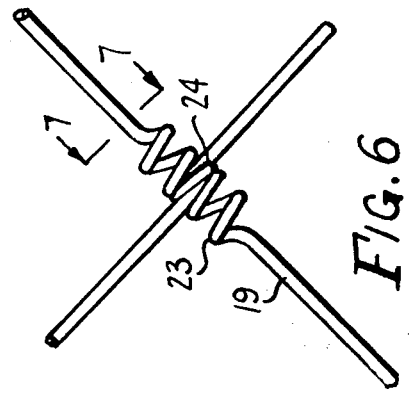
FIG.7
FIG.6

HOUSE TRAILER GROUND ANCHOR

BACKGROUND OF THE INVENTION

1. Field of the Invention

The present invention relates to ground anchors for house trailers to secure the trailer in a stationary position on the ground.

2. Summary of the Invention

In forming the anchor of the present invention two holes are bored into the ground at a converging angle so as to intersect and are filled with concrete. A pair of rods extend centrally down each hole and are interconnected at their juncture. Each rod has a loop which extends above the concrete at the upper end and turnbuckles connect the loops to the frame of the trailer to secure it to the ground. A strap extends over the trailer and a second turnbuckle connects each end of the strap to the adjacent loop.

The primary object of the invention is to provide a ground anchor for trailer homes to prevent the trailer homes from being buffeted by the wind.

Other objects and advantages will become apparent in the following specification when considered in the light of the attached drawings.

BRIEF DESCRIPTION OF THE DRAWINGS

FIG. 1 is a side elevation of the invention;

FIG. 2 is an enlarged fragmentary vertical transverse cross section taken along the line 2—2 of FIG. 1 looking in the direction of the arrows;

FIG. 3 is a perspective view of the anchor rods removed from the concrete;

FIG. 4 is a side elevation of one of the turnbuckle hooks;

FIG. 5 is a side elevation of another of the turnbuckle hooks;

FIG. 6 is a fragmentary transverse elevational view of the interlock portion of the anchor rods; and FIG. 7 is a sectional view taken along the line 7—7 of FIG. 6 looking in the direction of the arrows.

DESCRIPTION OF THE PREFERRED EMBODIMENT

Referring now to the drawings in detail wherein like reference characters indicate like parts throughout the several figures the reference numeral 10 indicates generally a trailer home ground anchor constructed in accordance with the invention.

The ground anchor 10 is intended for use with a relatively large trailer home 11 of the type having a pair of longitudinal frame members 12 supporting the body 13 of the trailer and in turn supported by a plurality of wheels 14. A tongue 15 extends forwardly of the trailer 11 and is supported on a jack 16 when the trailer 11 is parked. The trailer 11 is of a conventional design and may be any conventional trailer.

The ground anchor 10 includes an elongate hole 17 extending into the ground at an angle to the vertical and intersecting a second elongate hole 18 which extends into the ground at an angle to the vertical and opposite to the hole 17 so that the holes 17, 18 intersect substantially midway of the trailer 11.

A rod 19 extends centrally of the hole 17 completely therethrough and has a loop 20 formed on its upper end which extends above the ground line. A second rod 21 extends completely through the center of the hole 18 and has a loop 22 formed on its upper end which extends above the ground line. The rod 19 has a spiral screw portion 23 formed therein so as to align with the hole 18. The rod 21 has a complete loop 24 formed therein at a position to align with the hole 17. In assembling the ground anchor 10 the rod 21 is first placed in the hole 18 and the rod 19 is then placed in the hole 17 and as the rod 19 engages the loop 24 it is threaded through the loop 24 so as to interlock the rods 19 and 21.

The holes 17 and 18 are then filled with concrete 25 which is allowed to harden with the loops 20, 22 extending thereabove.

An L-shaped hook 26 engages over the frames 12 and has a turnbuckle 27 secured thereto at one end and secured to the loops 20, 22 at the other end as can be seen in FIG. 3. Tightening of the turnbuckles 27 pulls the frames 12 downwardly to place tension thereon and anchor them against being moved by the wind.

A flexible strap 28 is extended over the trailer body 13 and has eyes 29 on its opposite ends. Turnbuckles 30 are connected at one end to the eyes 29 and at the opposite ends to the loops 20, 22 so as to permit the trailer body 13 to be held snugly to its frame 12 against being moved by the wind.

In FIG. 1 a pair of anchors 10 have been illustrated but it should be understood that additional anchors 10 will be used when the length of the trailer or weather conditions require.

It should be understood that regardless of the direction of the wind striking the trailer the present invention will maintain the trailer firmly against the earth.

Having thus described the preferred embodiment of the invention it should be understood that numerous structural modifications and adaptations may be resorted to without departing from the spirit of the invention.

I claim:

1. A ground anchor for trailer homes of the type including a frame supported on wheels and a body supported on the frame comprising a pair of intersecting holes extending at a downwardly converging angle beneath the trailer home, a pair of anchor rods extending completely through each hole, means on each of said anchor rods cooperating to interlock said anchor rods at their juncture, concrete completely filling said holes with said anchor rods embedded therein, and means for securing said trailer home to said anchor rods to anchor said trailer home in position.

2. A device as claimed in claim 1 wherein the means for interlocking said anchor rods comprises a loop formed in one of said rods and a spiral portion formed in the other of said rods to be threaded into said loop.

3. A device as claimed in claim 2 wherein each of said anchor rods is provided with a loop at the upper end thereof extending above the concrete in said holes and the means for securing said trailer home to said anchor rods is connected to said loops.

4. A device as claimed in claim 3 wherein the means for connecting said trailer home to said anchor rods comprises a hook engaged over the frame of said trailer and a turnbuckle connected at one end to said hook and at the opposite end to the loop on one of said anchor rods.

5. A device as claimed in claim 4 wherein the means for anchoring said trailer home to said anchor rods includes a flexible strap extending completely over the body of said trailer home and a pair of turnbuckles connected to the opposite ends of said strap at one end and to the loops on said anchor rod at the other end for securing the body of said trailer to its frame.

* * * * *